United States Patent

[11] 3,590,139

[72] Inventors George W. Gillemot
2331 20th St., Santa Monica, Calif. 90405;
John T. Thompson, 244 Loring St., Los Angeles, Calif. 90024
[21] Appl. No. 885,243
[22] Filed Dec. 15, 1969
[45] Patented June 29, 1971

[54] CABLE CAPPING ACCESSORY
8 Claims, 3 Drawing Figs.

[52] U.S. Cl. ................................................. 174/76,
156/293, 174/41, 174/135, 264/262
[51] Int. Cl. ................................................. H02g 15/04
[50] Field of Search ................................................. 174/1, 10,
20, 23, 41, 52.6, 74, 74.1, 76, 77, 87, 135, 138,
138.4; 264/262, 272; 156/293, 294, 303.1; 53/36

[56] References Cited
UNITED STATES PATENTS
1,176,288 3/1916 Hamilton ..................... 174/87
2,145,705 1/1939 Wodtke ..................... 174/74 (.1)
2,925,461 2/1960 Anderson ..................... 174/87
3,087,606 4/1963 Bollmeier et al. ..................... 174/87 UX
3,359,361 12/1967 Oakman ..................... 174/76
FOREIGN PATENTS
1,409,873 7/1965 France ..................... 174/74 (.1)
164,334 9/1922 Great Britain ..................... 174/87
201,703 8/1923 Great Britain ..................... 174/87
840,744 7/1960 Great Britain ..................... 174/76

Primary Examiner—Laramie E. Askin
Attorney—Sellers and Brace

ABSTRACT: A capping accessory for hermetically sealing a cable end temporarily or permanently. The accessory is typically molded in one piece from a thermoplastic material sealable to potting compound and preferably includes a locator boss within its inner end as well as a plurality of flexible tangs projecting axially from its open end with their free ends securable to the adjacent surface of a cable assembled into the accessory. Adhesive tape wrapped about the cable in an area intermediate the top and bottom of the accessory aids in centering the cable therewithin as well as acts as an anchor ring to hold the cable against withdrawal from potting compound filling the accessory and surrounding the anchor ring.

PATENTED JUN29 1971 3,590,139
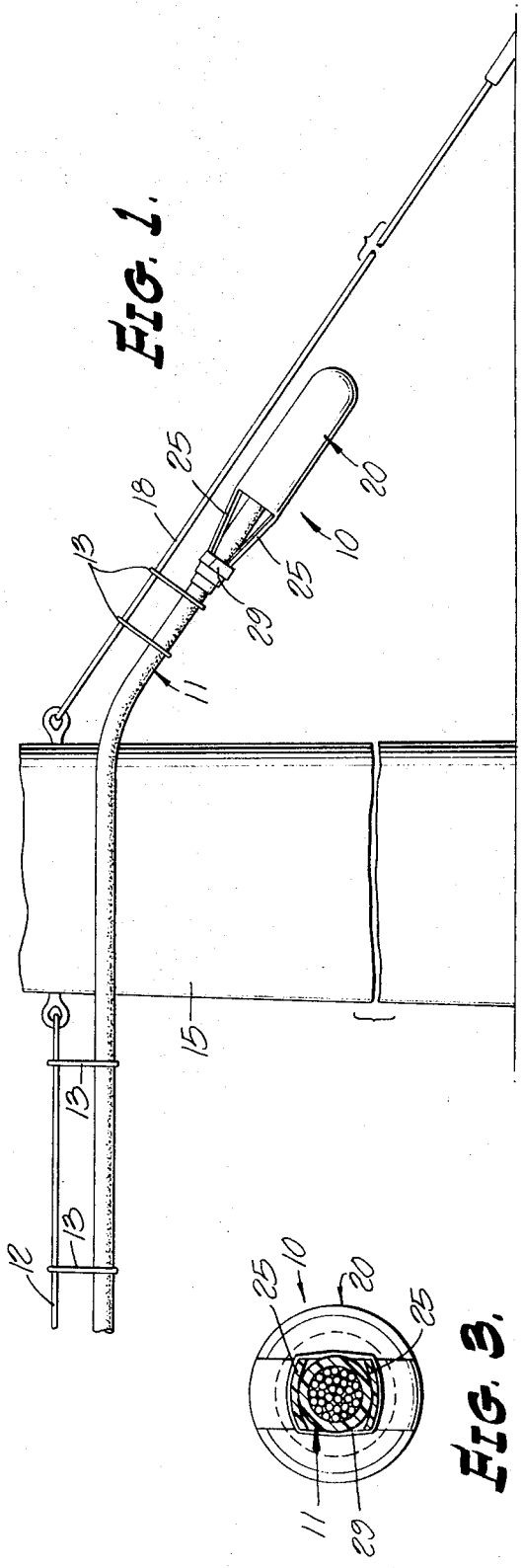
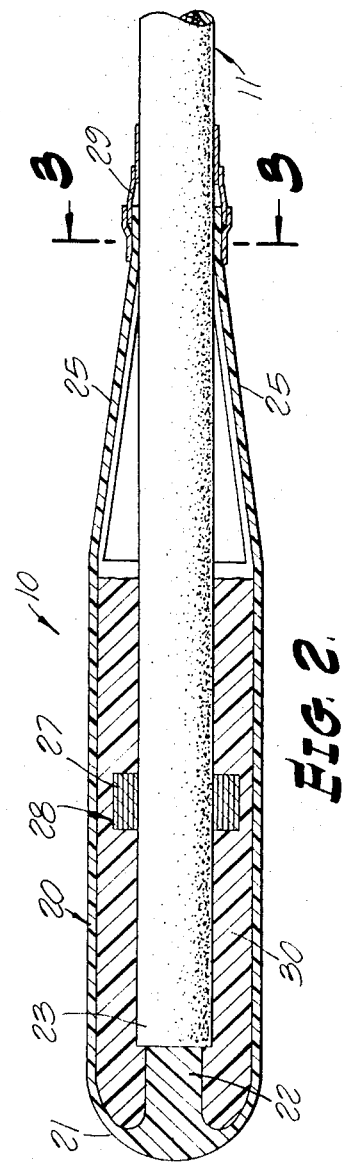
INVENTORS
GEORGE W. GILLEMOT
JOHN T. THOMPSON
BY
ATTORNEYS

CABLE CAPPING ACCESSORY

This invention relates to means for sealing the end of a cable and more particularly to a novel unitary one-piece capping accessory adapted to be telescoped over a cable end and hermetically sealed thereto with potting compound.

Various expedients have been proposed heretofore for protecting the end of a cable of conductors against the entry of moisture and foreign matter as well as preventing the escape of pressurizing gas commonly used to safeguard the cable against the entry of moisture. However, each is subject to one or more disadvantages avoided by the present invention.

By this invention there is provided a simple, lightweight, inexpensive, unitary capping accessory preferably molded from a suitable thermoplastic material. The main body of the accessory is generally tubular with one end closed and the other provided with integral tangs spaced about the periphery of the main body with their outer ends readily deflectable against the sheath of the cable being capped. These ends are held in this position by a serving of adhesive tape, thonging or the like. The equally stressed tangs are highly effective in holding the main body of the accessory spaced generally uniformly from the sides of the cable while the capping accessory is being charged with potting compound. To safeguard against withdrawal of the cable from the compound, the end portion of the cable enclosed by the cap is preferably provided with one or more ringlike wrappings of adhesive tape. This ringlet clings to the sheath of the cable tenaciously and strongly resists axial displacement of the ringlet axially of the cable. Not only does the ringlet aid in holding the cable centered within the accessory while the potting compound takes a set but it provides a highly effective anchor between the cable sheath and the compound.

Accordingly, it is a primary object of the present invention to provide an improved capping accessory for hermetically sealing the end of a cable and readily installable by the novice without need for tools.

Another object of the invention is the provision of a unitary, one-piece capping accessory adapted to be telescoped over the end of a cable and sealed thereto by a charge of potting compound filling the space between the cable sheath and the interior of the accessory.

Another object of the invention is the provision of an improved technique for hermetically sealing a cable end and anchoring both the sealant and the cable against withdrawal therefrom.

These and other more specific objects will appear upon reading the following specification and claims and upon considering in connection therewith the attached drawing to which they relate.

Referring now to the drawing in which a preferred embodiment of the invention is illustrated:

FIG. 1 is a side elevational view of a preferred embodiment of the invention capping accessory in a typical installed environment;

FIG. 2 is a longitudinal cross-sectional view of the capping accessory on an enlarged scale fully installed over a cable end; and FIG. 3 is a cross-sectional view taken along line 3-3 of FIG. 2.

Referring more particularly initially to FIG. 1, there is shown a typical embodiment of the invention capping accessory, designated generally 10, fully assembled to a multiple conductor cable 11. As there shown, cable 11 is suspended beneath a carrier cable 12 by means of suspension ringlets 13 in accordance with customary practice and supported by upright poles 15 at spaced intervals. The remainder of the cable to the right not having been installed, it is important that its end be hermetically sealed until such time as the remainder of the cable is installed and spliced to cable 11. Until this is done it is customary to cap the cable and stabilize it as by suitably supporting the capped end, as by ringlets 13 mounted on a guy wire 18 for pole 15.

The constructional details of capping accessory 10 are best illustrated in FIGS. 2 and 3. It will be understood that accessory 10 is preferably molded from suitable material in one piece. The main body 20 of the accessory may be described as generally tubular or as a deep cup-shaped member having a closed end 21 formed on its interior with a short boss 22. This boss is positioned to engage the inner end 23 of cable 11 and safeguards against the possibility of the cable being telescoped into the accessory until it abuts end wall 21. The presence of boss 22 assures that there will be an ample quantity of sealant between the end of the cable and end wall 21.

The opposite or open end of the main body includes at least two long flexible tangs. Initially, tanks 25 are coextensive with the sidewalls of main body 20, but being of tough flexible material, they are deflectable inwardly until they engage the exterior surface of the cable sheath for a purpose to be explained more fully presently.

The main body 20 of accessory 10 is preferably formed of transparent thermoplastic material capable of withstanding abusive handling, wide changes in weather conditions and the ability to form a strong bond with conventional potting compounds including the epoxies and the like resinous compounds. Polycarbonate thermoplastic compound well known to those skilled in the plastic art is particularly satisfactory because it meets the foregoing qualifications to a high degree and because of its pronounced capability to form a strong and permanent bond with conventional potting compounds.

The assembly of the capping accessory to the end of the cable is performed quickly and without need for any but the simplest tools. It is important that the completed cap be hermetically sealed and be impermeable by and to retain the relatively low internal gas pressure customarily carried by many cables to safeguard against the possibility of vapor and moisture of any character entering the cable.

The initial assembly step comprises tightly wrapping the cable sheath backwardly from its end with multiple convolutions of adhesive tape 27 to form a thick anchor ringlet 28. Desirably, a tape having an elastomeric main body and a strong pressure sensitive adhesive layer is employed. This tape is wrapped in successive convolutions to provide a ringlet having an outer diameter intermediate that of the cable sheath and the interior diameter of main body 20. Although only a single ringlet is shown in FIG. 2, it will be understood that two or more similar ringlets may be provided at closely spaced intervals intermediate the bottom and the open end of main body 20. These ringlets being wrapped under moderate tension form very effective anchor rings clinging tenaciously to the cable sheath.

The anchor ringlets 28 having been completed, the operator inserts the prepared cable end into the open end of accessory 10 until the cable seats against the end of boss 22. Tangs 25 are then flexed toward one another until their free ends engage the surface of the sheath. While held in this position, the tangs are wrapped with several servings of tape or thonging 29.

Any suitable potting compound 30 in fluent condition is then charged into the upright capping accessory through the openings provided between the lateral edges of tangs 25. Preferably, the main body is formed of a transparent material thereby enabling the operator to make certain that the cable is properly centered within the cap with its end in contact with boss 22. The assembly is shaken if necessary to dislodge trapped air readily visible through the transparent sidewall. Usually the compound fills the entire space substantially to the level of the open end, the accessory being left in an upright position while the compound takes a firm set. Once this occurs, it is known that the compound is bonded to all surfaces in contact therewith thereby providing a hermetic seal for the embedded end of the cable. The bonding interface between the compound and the cable sheath is not relied upon primarily to withstand forces tending to separate the cable from the cap assembly. Rather the main strain of the anchorage is assumed by ringlet 28 which is firmly bonded to the cable sheath with the remainder of the ringlet embedded in the potting compound.

Should it become desirable for any reason to remove the capping accessory, the operator merely removes the serving tape 29 thereby freeing the outer ends of tangs 25. These tangs may then be grasped and pulled outwardly and backwardly to the left as viewed in FIG. 2 with sufficient force to rupture and destroy main body 20. This body having been removed, the potting compound may be readily removed. Alternatively, the cable may be severed even with the end of the potting compound.

While the particular cable capping accessory herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

We claim:

1. In combination with the end of a cable, a cable capping accessory comprising a deep cup-shaped main body of thermoplastic material having an ID substantially greater than the OD of the end portion of said cable, the lip edges of said main body being notched axially thereof to provide a pair of long tough flexible resilient tangs projecting axially from the diametrically opposed peripheral edge portions of the open end of said main body, means holding the outer free ends of said tangs secured against the juxtaposed exterior surfaces of said cable sheath after the end of the latter has been telescoped into said main body and cooperating to hold the cable end generally centered between the sidewalls of said main body, the edges of said tangs being spaced apart sufficiently to facilitate charging the interior of said main body with potting compound, and a charge of potting compound substantially filling the space between said cable and said main body and hermetically sealed to the interior surface thereof and to the adjacent surface of the cable.

2. The combination defined in claim 1 characterized in the provision of spacer means between the inner end of said main body and the end of said cable for supporting the cable end axially from the inner end of the main body thereby assuring a substantial thickness of potting compound opposite the inner end of said cable.

3. The combination defined in claim 2 characterized in that said cup-shaped capping accessory and attached tangs are formed in one seamless piece from transparent thermoplastic material.

4. The combination defined in claim 1 characterized in the provision of a spacer 28 ring secured about the exterior of the cable and embedded in said potting compound, said spacer ring facilitating centering the cable in said main body while the potting compound is taking a set and being effective to anchor the cable to said compound and against withdrawal therefrom.

5. A one-piece molded thermoplastic capping accessory hermetically sealable to a cable end after telescopic assembly thereover, said capping accessory having a long tubular main body closed at one end and having a plurality of long resilient tangs projecting axially from diametrically opposed rim edge portions of the open end thereof, the free outer ends of said tangs being deflectable toward one another and adapted to be lashed against the sides of a cable end after the latter has been inserted into the open end of said capping accessory and their resiliency being effective to hold the cable end centered in the capping accessory while a charge of potting compound takes a set, and said accessory being chargeable with fluent potting compound of a type which takes a set and forms a strong hermetic seal with a cable sheath and with the juxtaposed interior surfaces of said capping accessory.

6. A cable end capping accessory as defined in claim 5 characterized in that the interior end of said main body includes a boss projecting therefrom and positioned to engage and act as a stop for the cable end as the latter is telescoped into assembled position over a cable end and leaving room between the cable end and the interior end of said main body to receive potting compound.

7. That method of hermetically sealing the end of a multiconductor cable which comprises, inserting the cable end into a tubular cup-shaped casing molded in one piece from tough resilient thermoplastic material and having its inlet end deeply notched to provide a pair of long resilient tangs diametrically opposed to one another along the opposite sides of the cable, pressing the outer free ends of said resilient tangs toward one another and lashing said free ends to the juxtaposed surfaces of the cable so that the stresses so created in said tangs act to hold the cable end centered within said cup-shaped casing while a charge of fluent potting compound is taking a set, and thereafter charging fluent potting compound into said casing between and near the junction of said tangs with the inlet end of said casing.

8. That method defined in claim 7 characterized in the steps of wrapping the cable inwardly of the end to be sealed with concentric convolutions of adhesive tape to form an anchor ringlet and having an outer diameter less than the interior diameter of said casing before assembling the casing thereover, and charging said potting compound into said casing to a depth submerging said anchor ringlet.